United States Patent
Reichert

(10) Patent No.: US 8,374,750 B2
(45) Date of Patent: Feb. 12, 2013

(54) METHOD AND DEVICE FOR RECOGNIZING DRIVER FATIGUE USING A TORQUE SENSOR SYSTEM

(75) Inventor: Andreas Reichert, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 12/308,314

(22) PCT Filed: Nov. 7, 2007

(86) PCT No.: PCT/EP2007/061978
§ 371 (c)(1),
(2), (4) Date: Apr. 14, 2010

(87) PCT Pub. No.: WO2008/083870
PCT Pub. Date: Jul. 17, 2008

(65) Prior Publication Data
US 2010/0191422 A1  Jul. 29, 2010

(30) Foreign Application Priority Data
Jan. 9, 2007 (DE) .................. 10 2007 001 362

(51) Int. Cl.
*G05D 1/00* (2006.01)
(52) U.S. Cl. ............... 701/42; 701/41; 701/70; 701/90; 180/252; 180/421; 180/422; 180/423; 180/427; 477/107; 475/2
(58) Field of Classification Search ........... 701/41, 701/70, 90, 42; 180/252, 421, 422, 423, 180/427, 429, 444, 446; 477/107; 475/2
See application file for complete search history.

(56) References Cited

U.S. PATENT DOCUMENTS

| | | | |
|---|---|---|---|
| 4,463,347 A | | 7/1984 | Seko et al. |
| 4,496,938 A | | 1/1985 | Seko et al. |
| 4,564,833 A | | 1/1986 | Seko et al. |
| 4,862,749 A | * | 9/1989 | Yagi ............................. 73/650 |
| 4,926,105 A | * | 5/1990 | Mischenko et al. .......... 318/800 |
| 5,757,156 A | * | 5/1998 | Sasajima ...................... 318/456 |
| 5,921,780 A | * | 7/1999 | Myers ............................ 434/69 |
| 6,906,639 B2 | * | 6/2005 | Lemelson et al. ............ 340/903 |
| 7,322,438 B2 | | 1/2008 | Hayashi |
| 7,821,384 B2 | * | 10/2010 | Kocher ........................ 340/435 |
| 2004/0124985 A1 | * | 7/2004 | Young et al. ................. 340/575 |
| 2004/0224811 A1 | * | 11/2004 | Vornehm et al. ............. 475/207 |
| 2005/0067210 A1 | * | 3/2005 | Hayashi ....................... 180/272 |
| 2005/0072621 A1 | * | 4/2005 | Hara et al. .................... 180/444 |
| 2005/0206230 A1 | * | 9/2005 | Donnelly ..................... 303/139 |
| 2007/0000709 A1 | * | 1/2007 | Danger et al. ................ 180/272 |
| 2010/0191422 A1 | | 7/2010 | Reichert |

FOREIGN PATENT DOCUMENTS

| | | |
|---|---|---|
| DE | 10 2004 047 136 | 4/2006 |
| DE | 10 2005 057267 | 6/2007 |
| EP | 1 645 454 | 4/2006 |
| JP | 5-018198 | 5/1993 |
| JP | 9-216567 | 8/1997 |
| JP | 10-166891 | 6/1998 |
| JP | 2005-104240 | 4/2005 |
| WO | 01/60254 | 8/2001 |
| WO | 02/17787 | 3/2002 |
| WO | 2007/031619 | 3/2007 |

* cited by examiner

*Primary Examiner* — Mary Cheung
*Assistant Examiner* — McDieunel Marc
(74) *Attorney, Agent, or Firm* — Kenyon & Kenyon LLP

(57) ABSTRACT

A method is provided for recognizing the fatigue of a driver of a vehicle. In the method a torque variable representing the torque applied to the steering wheel by the driver is detected, and the presence of fatigue of the driver is detected on the basis of the torque variable.

12 Claims, 2 Drawing Sheets

METHOD AND DEVICE FOR RECOGNIZING DRIVER FATIGUE USING A TORQUE SENSOR SYSTEM

FIELD OF THE INVENTION

The present invention relates to a method for recognizing the fatigue of a driver of a vehicle.

BACKGROUND INFORMATION

A method for learning the reactions of the driver of a vehicle is discussed in DE 10 2004 047 136 A1, in which typical reactions of the driver to events are ascertained on the basis of the driver's operation of control elements of the vehicle, and conclusions concerning a fatigued or rested driver are drawn on the basis of deviations from the driver's typical reactions.

SUMMARY OF THE INVENTION

The present invention relates to a method for recognizing the fatigue of a driver of a vehicle, in which
a torque variable representing the torque applied to the steering wheel by the driver is detected, and
the presence of fatigue of the driver is detected on the basis of the torque variable, in particular the variation of the torque variable over time.

The present invention allows fatigue of a driver to be recognized in a simple and uncomplicated manner.

According to one advantageous embodiment of the present invention, fatigue of the driver is detected as being present when an abrupt change in the torque variable is detected.

According to one advantageous embodiment of the present invention, fatigue of the driver is detected as being present when the torque variable
falls below a specified first threshold value during a first time interval and
exceeds a specified second threshold value during a subsequent second time interval, and
the time between the end of the first time interval and the start of the second time interval falls below a third threshold value.

An abrupt change in the torque variable may be easily detected in this manner.

According to one advantageous embodiment of the present invention,
the steering wheel is connected or mechanically linked to an at least partially electrical steering system having an electric motor, and
fatigue of the driver is detected as being present only when the abrupt change in the torque variable has resulted in a change in the rotor position of the electric motor.

In this manner verification is made that the change in the torque variable is the result of a steering motion by the driver.

According to one advantageous embodiment of the present invention, the steering system is an electronic power steering system.

According to one advantageous embodiment of the present invention, the torque variable is detected using a torque sensor.

According to one advantageous embodiment of the present invention, the torque sensor is mounted on the steering column.

According to one advantageous embodiment of the present invention, a driver warning or driver information is generated when fatigue of the driver is detected.

The present invention also includes a device which contains detecting arrangements to carry out the present methods.

DETAILED DESCRIPTION

The present invention is based on the presence of a torque sensor system in the motor vehicle which detects a steering motion or steering wheel motion. This torque sensor system is present in electronic power steering (EPS) systems, for example, and may also be used for recognizing fatigue of the driver. The torque sensor system present in EPS systems has a very high signal resolution, and is therefore able to detect very small changes in torque on the steering wheel. To verify that the ascertained change in torque is caused by the driver, the output signal of the torque sensor may be compared to the output signal of the motor position sensor of the EPS system. The signal of the change in torque caused by the driver must be present, in terms of time, before the motor position change signal and before the steering angle signal derived therefrom, since the control time required by the EPS system causes a time delay; i.e., a steering wheel torque applied by the driver does not result in an activation of the EPS motor until after a time delay.

Figure 1:
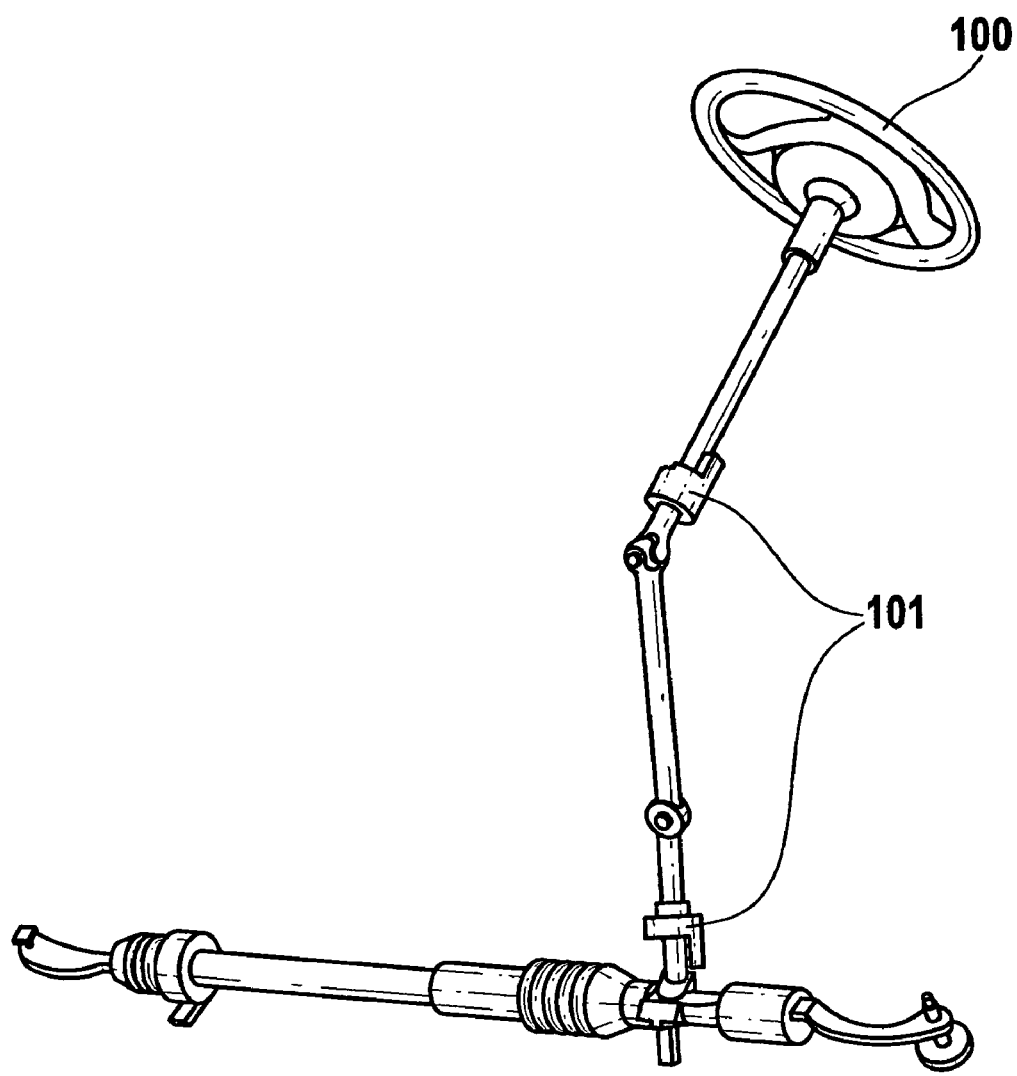
FIG. 1 shows a steering assembly having a torque sensor system.

A fatigued driver applies an abrupt or sudden force to the steering wheel due to muscular contractions, which generates a torque. This change in torque is detected by a torque sensor. In this regard, reference is made to FIG. 1. In FIG. 1, reference numeral 100 denotes the steering wheel and reference numeral 101 denotes two possible installation sites for a torque sensor, namely, the upper or lower steering column. The EPS motor must be situated below the torque sensor; i.e., the torque sensor must be located between the steering wheel and the EPS motor in order to detect the driver torque.

Figure 2:
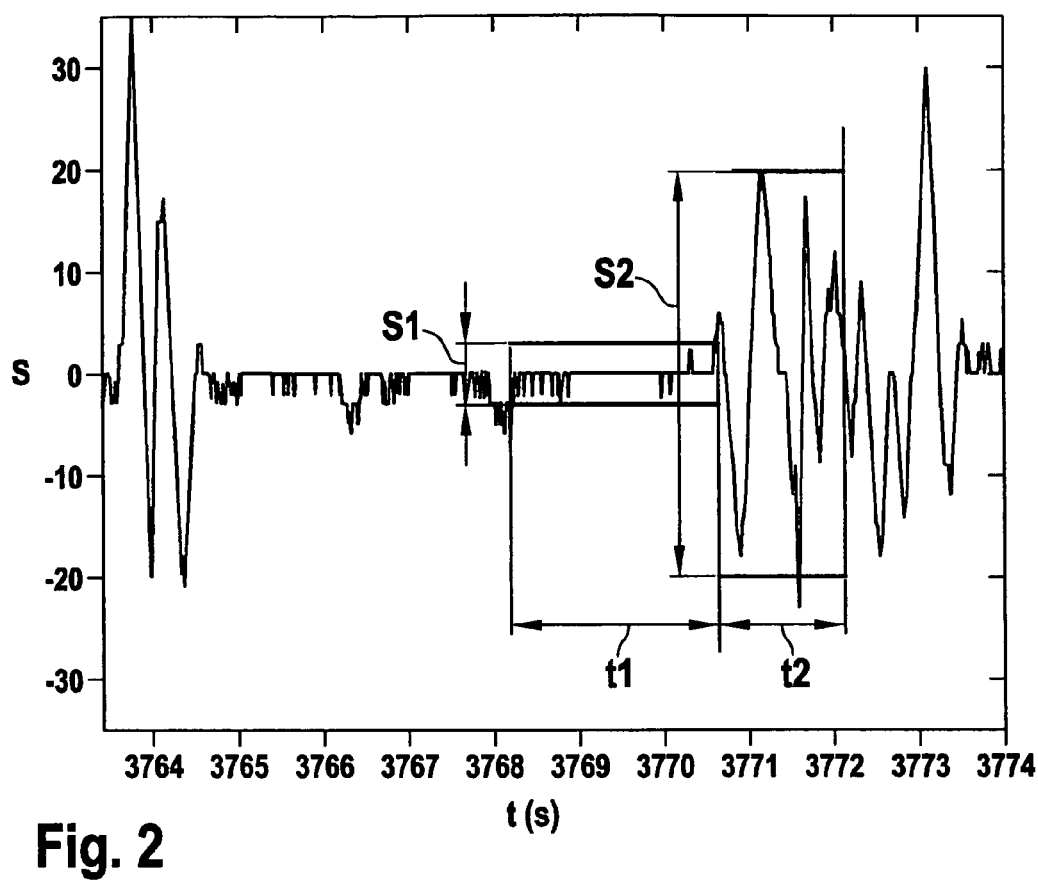
FIG. 2 shows a typical motion sequence for fatigue.

In FIG. 2, time t is plotted in seconds on the abscissa, and a variable S which represents driver activity is plotted on the ordinate. This variable may be steering wheel torque M, for example.

This diagram shows a typical motion sequence having an initial time-based resting phase t1 in which the driver shows little activity. The low activity is ascertained on the basis of the magnitude of S consistently being below threshold value S1. This phase t1 is followed by an abrupt motion sequence, extending over time interval t2, in which threshold value S2 is reached or exceeded. This sequence pattern represents a typical sequence of driver steering motion when fatigue is present. As the result of fatigue, a rapid, abrupt back-and-forth motion of the steering wheel is exhibited by the driver during time interval t2.

This time-based motion diagram is measured using a torque sensor and is then analyzed using an algorithm. For the analysis of driver fatigue this information may be provided to an additional system in order to make the driver aware of his fatigue, for example by use of optical, acoustic, or haptic warning information.

The described system may also be used for checking the plausibility of an additional fatigue recognition system. This may be a vision system, for example, which detects the motions of the driver's eyes and eyelids, and on the basis of these motions draws a conclusion concerning the fatigue of the driver. A steering angle sensor may also be used to generate a profile of the driver steering motions, from which a conclusion concerning fatigue may once again be drawn. In addition to fatigue recognition, other motion patterns of the driver may be analyzed using the present invention, for example evasive maneuvers or "sporty driving."

Figure 3:
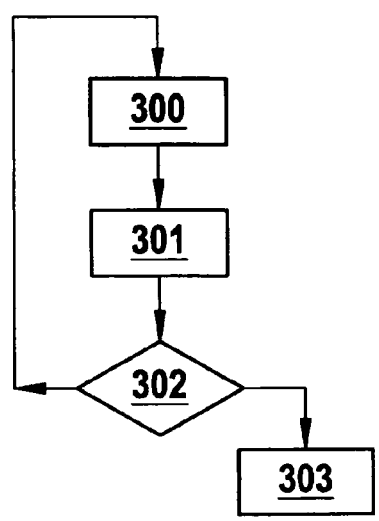
FIG. 3 shows the sequence of the method according to the present invention.

The basic sequence of the method according to the present invention is illustrated in FIG. 3. After the method begins in block 300, a torque variable which represents the torque applied to the steering wheel by the driver is detected in block 301. In block 302 a query is then made as to whether an abrupt change in the torque variable is present. If an abrupt change in the torque variable is present, the presence of fatigue of the driver is detected in block 303. However, if no abrupt change in the torque variable is detected in block 302, a branch is made back to block 300, and the method is carried out again.

What is claimed is:

1. A method for recognizing fatigue of a driver of a vehicle, the method comprising:
    detecting a torque variable representing a torque applied to a steering wheel by the driver; and
    detecting a presence of the fatigue of the driver on the basis of a change in the torque variable;
    wherein fatigue of the driver is detected as being present when the torque variable falls below a specified first threshold value during a first time interval, exceeds a specified second threshold value during a subsequent second time interval, and a time between the end of the first time interval and the start of the second time interval falls below a third threshold value.

2. The method of claim 1, wherein the steering wheel is connected or mechanically linked to an at least partially electrical steering system having an electric motor, and fatigue of the driver is detected as being present only when the abrupt change in the torque variable has resulted in a change in the rotor position of the electric motor.

3. The method of claim 2, wherein the steering system is an electronic power steering system.

4. The method of claim 1, wherein the torque variable is detected using a torque sensor.

5. The method of claim 4, wherein the torque sensor is mounted on the steering column.

6. The method of claim 1, wherein a driver warning or driver information is generated when fatigue of the driver is detected.

7. A device for recognizing fatigue of a driver of a vehicle, comprising:
    a first detecting arrangement to detect a torque variable representing a torque applied to a steering wheel by the driver; and
    a second detecting arrangement to detect a presence of the fatigue of the driver on the basis of a change in the torque variable;
    wherein fatigue of the driver is detected as being present when the torque variable falls below a specified first threshold value during a first time interval, exceeds a specified second threshold value during a subsequent second time interval, and a time between the end of the first time interval and the start of the second time interval falls below a third threshold value.

8. The device of claim 7, wherein the steering wheel is connected or mechanically linked to an at least partially electrical steering system having an electric motor, and fatigue of the driver is detected as being present only when the abrupt change in the torque variable has resulted in a change in the rotor position of the electric motor.

9. The device of claim 8, wherein the steering system is an electronic power steering system.

10. The device of claim 7, wherein the torque variable is detected using a torque sensor.

11. The device of claim 10, wherein the torque sensor is mounted on the steering column.

12. The device of claim 10, wherein a driver warning or driver information is generated when fatigue of the driver is detected.

* * * * *

UNITED STATES PATENT AND TRADEMARK OFFICE
CERTIFICATE OF CORRECTION

PATENT NO.        : 8,374,750 B2
APPLICATION NO.   : 12/308314
DATED             : February 12, 2013
INVENTOR(S)       : Andreas Reichert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this
First Day of September, 2015

Michelle K. Lee
*Director of the United States Patent and Trademark Office*